US012597982B2

(12) United States Patent
Frank

(10) Patent No.: US 12,597,982 B2
(45) Date of Patent: Apr. 7, 2026

(54) DETERMINING ERROR VECTOR MAGNITUDE FOR A SINGLE LAYER TRANSMISSION USING A MULTIPLE-INPUT MULTIPLE-OUTPUT RECEIVER

(71) Applicant: Lenovo (Singapore) Pte. Ltd., New Tech Park (SG)

(72) Inventor: Colin D. Frank, Park Ridge, IL (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 179 days.

(21) Appl. No.: 18/260,771

(22) PCT Filed: Jan. 7, 2022

(86) PCT No.: PCT/IB2022/050120
§ 371 (c)(1),
(2) Date: Jul. 7, 2023

(87) PCT Pub. No.: WO2022/149097
PCT Pub. Date: Jul. 14, 2022

(65) Prior Publication Data
US 2024/0305356 A1     Sep. 12, 2024

Related U.S. Application Data

(60) Provisional application No. 63/134,897, filed on Jan. 7, 2021.

(51) Int. Cl.
*H04B 7/08*        (2006.01)
(52) U.S. Cl.
CPC .................................. *H04B 7/0854* (2013.01)

(58) Field of Classification Search
CPC ............................ H04B 7/0854; H04B 7/0891
See application file for complete search history.

(56) References Cited

U.S. PATENT DOCUMENTS

| | | | | |
|---|---|---|---|---|
| 7,664,200 B2* | 2/2010 | Ariyavisitakul | ...... | H04L 1/0631 375/267 |
| 2013/0238262 A1* | 9/2013 | Asami | ................. | H04L 27/2647 702/58 |

(Continued)

OTHER PUBLICATIONS

PCT/IB2022/050120, "Notification of Transmittal of the International Search Report and the Written Opinion of the International Searching Authority, or the Declaration", International Searching Authority, May 9, 2022, pp. 1-15.

(Continued)

*Primary Examiner* — Dac V Ha
(74) *Attorney, Agent, or Firm* — Kunzler Needham & Hilton

(57) ABSTRACT

Apparatuses, methods, and systems are disclosed for calculating an error vector magnitude ("EVM") of a transmitter. An apparatus includes a transceiver that receives, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas and a processor that determines an EVM for the single layer transmission from the transmitter based on an output of the unbiased linear MIMO receiver, the EVM defined as 100 times a square root of a mean-square error at the output of the unbiased linear MIMO receiver.

20 Claims, 8 Drawing Sheets

(56)  References Cited

U.S. PATENT DOCUMENTS

| | | | |
|---|---|---|---|
| 2016/0337985 A1* | 11/2016 | Amizur | H04W 52/367 |
| 2017/0214429 A1* | 7/2017 | Eistein | H04L 1/0048 |
| 2020/0186206 A1* | 6/2020 | Estella Aguerri | H04B 7/0413 |
| 2023/0299862 A1* | 9/2023 | O'Shea | G06N 3/045 |
| | | | 370/252 |

OTHER PUBLICATIONS

Motorola Mobility, "Considerations on the EVM Definition for an Antenna Port or a Single MIMO Layer", 3GPP TSG-RAN WG4 Meeting RAN4#95-e R4-2008276, May 25-Jun. 5, 2020, pp. 1-5.

Qualcomm, "WF on Enabling Transparent TxD in Rel-16", 3GPP TSG-RAN WG4 Meeting # 95-e R4-2008465, May 25-Jun. 5, 2020, pp. 1-9.

Lenovo et al., "Further Considerations on the EVM Definition for Antenna Ports Including Transparent Transmit Diversity", 3GPP TSG-RAN WG4 Meeting RAN4#96-e R4-2011519, Aug. 17-28, 2020, pp. 1-9.

Lenovo et al., "On the Transmit EVM Requirement for UL MIMO Transmission", 3GPP TSG-RAN WG4 Meeting RAN4#96-e R4-2011520, Aug. 17-28, 2020, pp. 1-9.

Intel Corp., "Remaining Issues on Transparent TxD", 3GPP TSG-RAN WG4 Meeting #97-e R4-2014583, Nov. 2-13, 2020, pp. 1-7.

* cited by examiner

100

Ratio of MIMO EVM to WF EVM, correlation=0.5

P1/(P1+P2)

EVM2/EVM1=0.2
EVM2/EVM1=0.5
EVM2/EVM1=1
EVM2/EVM1=2
EVM2/EVM1=5

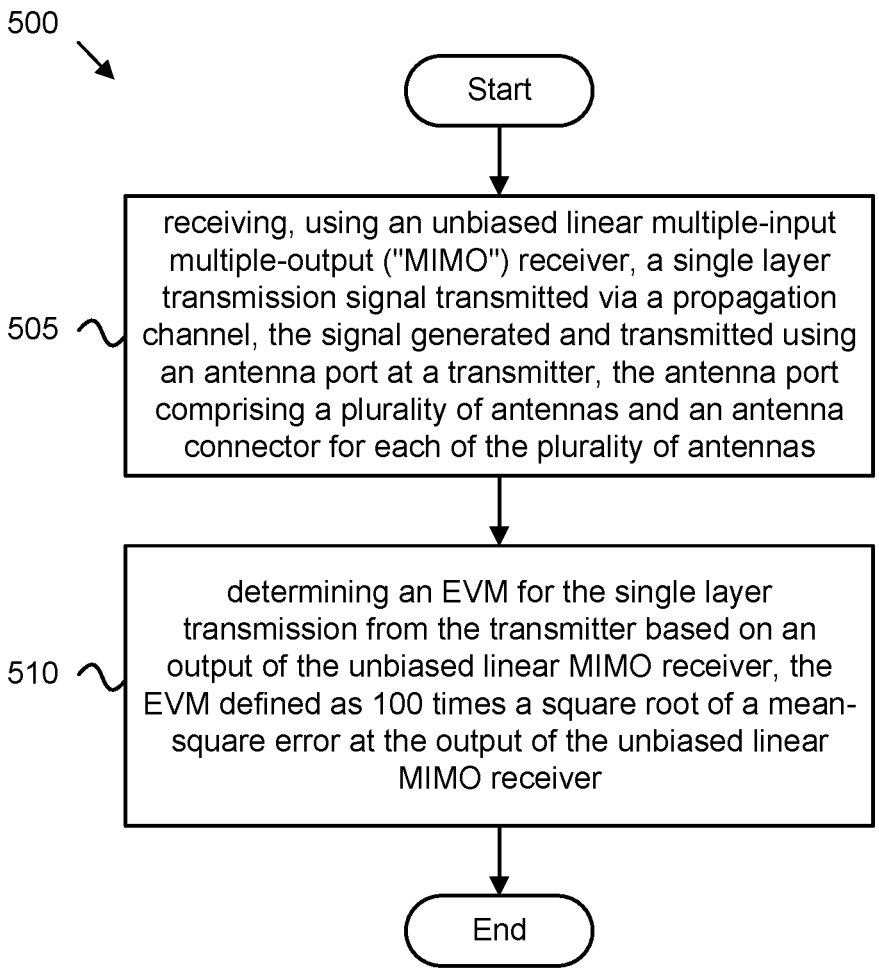

500

Start 505  receiving, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas 510  determining an EVM for the single layer transmission from the transmitter based on an output of the unbiased linear MIMO receiver, the EVM defined as 100 times a square root of a mean-square error at the output of the unbiased linear MIMO receiver End

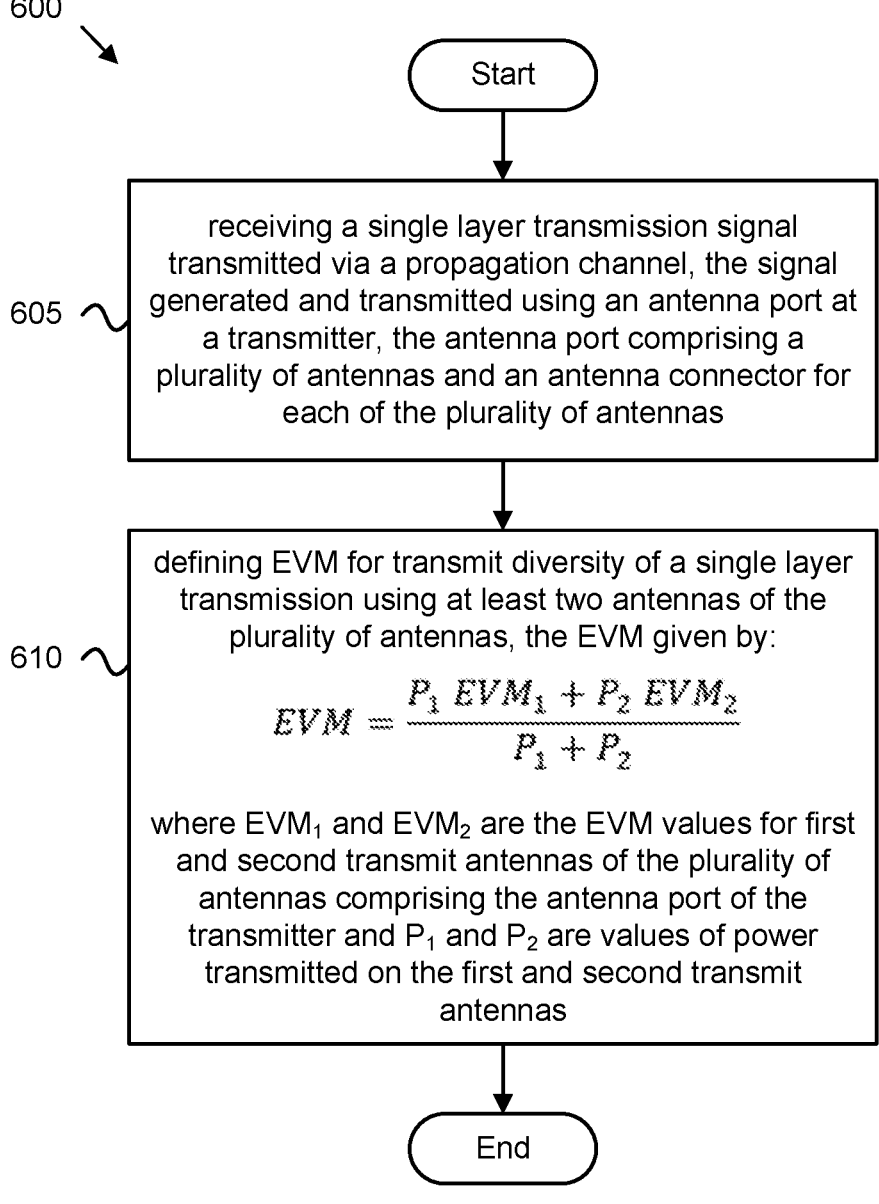

Start 605   receiving a single layer transmission signal transmitted via a propagation channel, the signal generated and transmitted using an antenna port at a transmitter, the antenna port comprising a plurality of antennas and an antenna connector for each of the plurality of antennas 610   defining EVM for transmit diversity of a single layer transmission using at least two antennas of the plurality of antennas, the EVM given by:

$$EVM = \frac{P_1\ EVM_1 + P_2\ EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas End

FIG. 6

DETERMINING ERROR VECTOR MAGNITUDE FOR A SINGLE LAYER TRANSMISSION USING A MULTIPLE-INPUT MULTIPLE-OUTPUT RECEIVER

CROSS-REFERENCE TO RELATED APPLICATIONS

This application claims priority to U.S. Provisional Patent Application No. 63/134,897 entitled "EVM DEFINITION FOR A SINGLE LAYER TRANSMISSION USING A MIMO RECEIVER" and filed on Jan. 7, 2021, for Colin D. Frank, which application is incorporated herein by reference.

FIELD

The subject matter disclosed herein relates generally to wireless communications and more particularly relates to determining error vector magnitude ("EVM") for a single layer transmission using a multiple-input multiple-output ("MIMO") receiver.

BACKGROUND

In wireless communication devices, EVM may be defined using an unbiased linear minimum mean square error ("MMSE") receiver. In this approach, the EVM is independent of the channel between the transmitter and the receiver. However, while the result is theoretically correct, there is some concern that the EVM definition is independent of the power distribution between the two transmit antennas. While the EVM definition assumes a noiseless receiver, the receiver may not be noiseless such that the noise floor at the receiver output will have some dependence on the power distribution at the transmitter. With the EVM definition based on the unbiased linear MMSE receiver, UE vendors may be encouraged to transmit a small amount of power on one antenna because the EVM expression is dependent on the minimum EVM of all of the transmit antennas from which the port is comprised. Thus, there is a need to define EVM requirements for transmit diversity, single layer transmissions and transmission from an antenna port using a MIMO receiver.

BRIEF SUMMARY

Disclosed are procedures for determining transmitter EVM for a single layer transmission using a MIMO receiver. In one embodiment, a first apparatus includes a transceiver that receives, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the first apparatus includes a processor that determines an EVM for the single layer transmission from the transmitter based on an output of the unbiased linear MIMO receiver, the EVM defined as 100 times a square root of a mean-square error at the output of the unbiased linear MIMO receiver.

In one embodiment, a first method includes receiving, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the first method includes determining an EVM for the single layer transmission from the transmitter based on an output of the unbiased linear MIMO receiver, the EVM defined as 100 times a square root of a mean-square error at the output of the unbiased linear MIMO receiver.

In one embodiment, a second apparatus includes a transceiver that receives a single layer transmission signal transmitted via a propagation channel, the signal generated and transmitted using an antenna port at a transmitter, the antenna port comprising a plurality of antennas and an antenna connector for each of the plurality of antennas. In one embodiment, the second apparatus includes a processor that defines EVM for transmit diversity of a single layer transmission using at least two antennas of the plurality of antennas, the EVM given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

In one embodiment, a second method includes receiving a single layer transmission signal transmitted via a propagation channel, the signal generated and transmitted using an antenna port at a transmitter, the antenna port comprising a plurality of antennas and an antenna connector for each of the plurality of antennas. In one embodiment, the second method includes defining EVM for transmit diversity of a single layer transmission using at least two antennas of the plurality of antennas, the EVM given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flowchart diagram illustrating one embodiment of a method for determining transmitter EVM for a single layer transmission using a MIMO receiver; and FIG. 6 is a flowchart diagram illustrating one embodiment of a method for determining transmitter EVM for a single layer transmission using a MIMO receiver.

DETAILED DESCRIPTION

Figure 1:
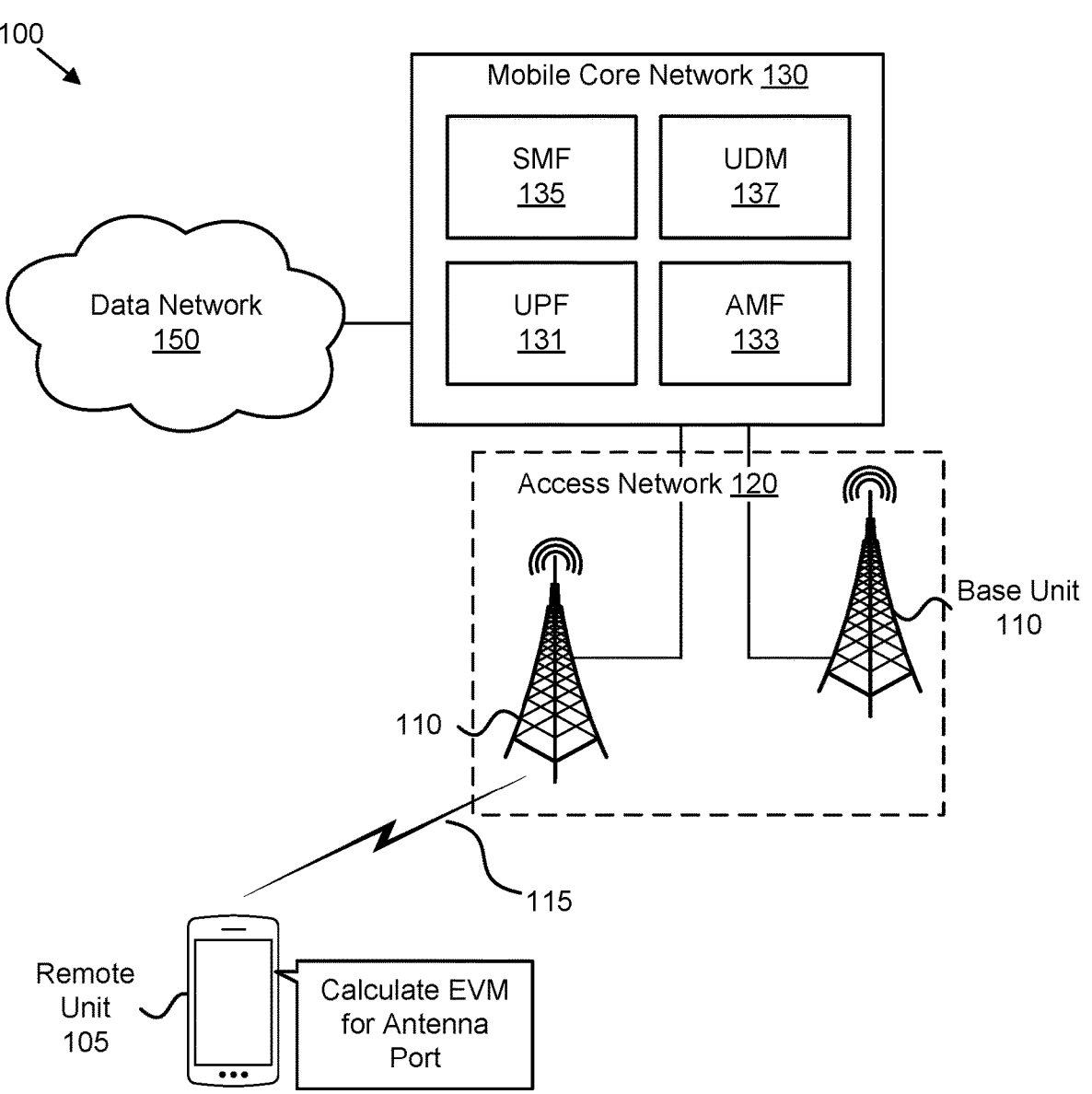
FIG. 1 is a schematic block diagram illustrating one embodiment of a wireless communication system for determining transmitter EVM for a single layer transmission using a MIMO receiver.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including." "comprising." "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for determining transmitter EVM for a single layer transmission using a MIMO receiver. An issue with developments in EVM definition for transmit diversity is that there is no relationship between the EVM definition and the signal-to-noise ratio ("SNR") at the output of a noiseless receiver, and thus the expression is purely ad hoc. It has been proposed to define EVM using an unbiased linear minimum mean square error ("MMSE") receiver. One advantage of this approach is that the EVM is independent of the channel between the transmitter and the receiver. However, while the result is theoretically correct, there is some concern that the EVM definition is independent of the power distribution between the two transmit antennas.

While the EVM definition assumes a noiseless receiver, the receiver will not be noiseless so that the noise floor at the receiver output will have some dependence on the power distribution at the transmitter. With the EVM definition based on the unbiased linear MMSE receiver, UE vendors may be encouraged to transmit a small amount of power on one antenna because the EVM expression is dependent on the minimum EVM of all of the transmit antennas from which the port is comprised.

There is a need to define EVM requirements for transmit diversity, single layer transmissions and transmission from an antenna port. In some embodiments, a MIMO receiver such as the zero-forcing MIMO receiver may define EVM for single layer transmission. However, in order to compute the zero-forcing MIMO receiver, it may be necessary to transmit reference symbols for a second layer that is not transmitted. In this disclosure, a closed form expression for the layer EVM in terms of the per antenna EVM's, the correlation of the transmitter noise, and the fraction of the power transmitted on each of the two antennas is proposed.

In the following descriptions, the terms antenna, panel, antenna panel, device panel and UE panel are used interchangeably. An antenna panel may be a hardware that is used for transmitting and/or receiving radio signals at frequencies lower than 6 GHz, e.g., frequency range 1 ("FR1", i.e., frequencies from 410 MHz to 7125 MHz), or higher than 6 GHz, e.g., frequency range 2 ("FR2", i.e., frequencies from 24.25 GHz to 52.6 GHz) or millimeter wave (mm-Wave). In some embodiments, an antenna panel may comprise an array of antenna elements, wherein each antenna element is connected to hardware such as a phase shifter that allows a control module to apply spatial parameters for transmission and/or reception of signals. The resulting radiation pattern may be called a beam, which may or may not be unimodal and may allow the device to amplify signals that are transmitted or received from spatial directions.

In some embodiments, an antenna panel may or may not be virtualized as an antenna port in the specifications. An antenna panel may be connected to a baseband processing module through a radio frequency ("RF") chain for each of transmission (egress) and reception (ingress) directions. A capability of a device in terms of the number of antenna panels, their duplexing capabilities, their beamforming capabilities, and so on, may or may not be transparent to other devices. In some embodiments, capability information may be communicated via signaling or, in some embodiments, capability information may be provided to devices without a need for signaling. In the case that such information is available to other devices, it can be used for signaling or local decision making.

In some embodiments, a device antenna panel (e.g., of a UE or RAN node) may be a physical or logical antenna array comprising a set of antenna elements or antenna ports that share a common or a significant portion of an RF chain (e.g., in-phase/quadrature ("I/Q") modulator, analog-to-digital ("A/D") converter, local oscillator, phase shift network). The device antenna panel or "device panel" may be a logical entity with physical device antennas mapped to the logical entity. The mapping of physical device antennas to the logical entity may be up to device implementation. Communicating (receiving or transmitting) on at least a subset of antenna elements or antenna ports active for radiating energy (also referred to herein as active elements) of an antenna panel requires biasing or powering on of the RF chain which results in current drain or power consumption in the device associated with the antenna panel (including power amplifier/low noise amplifier ("LNA") power consumption associated with the antenna elements or antenna ports). The phrase "active for radiating energy," as used herein, is not meant to be limited to a transmit function but also encompasses a receive function. Accordingly, an antenna element that is active for radiating energy may be coupled to a transmitter to transmit radio frequency energy or to a receiver to receive radio frequency energy, either simultaneously or sequentially, or may be coupled to a transceiver in general, for performing its intended functionality. Communicating on the active elements of an antenna panel enables generation of radiation patterns or beams.

In some embodiments, depending on device's own implementation, a "device panel" can have at least one of the following functionalities as an operational role of Unit of antenna group to control its Tx beam independently, Unit of antenna group to control its transmission power independently, Unit of antenna group to control its transmission timing independently. The "device panel" may be transparent to gNB. For certain condition(s), gNB or network can assume the mapping between device's physical antennas to the logical entity "device panel" may not be changed. For example, the condition may include until the next update or report from device or comprise a duration of time over which the gNB assumes there will be no change to the mapping.

A device may report its capability with respect to the "device panel" to the gNB or network. The device capability may include at least the number of "device panels." In one implementation, the device may support UL transmission from one beam within a panel; with multiple panels, more than one beam (one beam per panel) may be used for UL transmission. In another implementation, more than one beam per panel may be supported/used for UL transmission.

In some of the embodiments described, an antenna port is defined such that the channel over which a symbol on the antenna port is conveyed can be inferred from the channel over which another symbol on the same antenna port is conveyed. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. Two antenna ports may be quasi-located with respect to a subset of the large-scale properties and different subset of large-scale properties may be indicated by a QCL Type. For example, qcl-Type may take one of the following values:

i. 'QCL-TypeA': {Doppler shift, Doppler spread, average delay, delay spread} ii. 'QCL-TypeB': {Doppler shift, Doppler spread} iii. 'QCL-TypeC': {Doppler shift, average delay} iv. 'QCL-TypeD': {Spatial Rx parameter}

Spatial Rx parameters may include one or more of: angle of arrival (AoA,) Dominant AoA, average AoA, angular spread, Power Angular Spectrum (PAS) of AoA, average AoD (angle of departure), PAS of AoD, transmit/receive channel correlation, transmit/receive beamforming, spatial channel correlation, etc.

An "antenna port" according to an embodiment may be a logical port that may correspond to a beam (resulting from beamforming) or may correspond to a physical antenna on a device. In some embodiments, a physical antenna may map directly to a single antenna port, in which an antenna port corresponds to an actual physical antenna. Alternately, a set or subset of physical antennas, or antenna set or antenna array or antenna sub-array, may be mapped to one or more antenna ports after applying complex weights, a cyclic delay, or both to the signal on each physical antenna. The physical antenna set may have antennas from a single module or panel or from multiple modules or panels. The weights may be fixed as in an antenna virtualization scheme, such as cyclic delay diversity ("CDD"). The procedure used to derive antenna ports from physical antennas may be specific to a device implementation and transparent to other devices.

In some of the embodiments described, a TCI-state associated with a target transmission can indicate parameters for configuring a quasi-collocation relationship between the target transmission (e.g., target RS of DM-RS ports of the target transmission during a transmission occasion) and a source reference signal(s) (e.g., SSB/CSI-RS/SRS) with respect to quasi co-location type parameter(s) indicated in the corresponding TCI state. A device can receive a configuration of a plurality of transmission configuration indicator states for a serving cell for transmissions on the serving cell.

In some of the embodiments described, a spatial relation information associated with a target transmission can indicate parameters for configuring a spatial setting between the target transmission and a reference RS (e.g., SSB/CSI-RS/SRS). For example, the device may transmit the target transmission with the same spatial domain filter used for reception the reference RS (e.g., DL RS such as SSB/CSI-RS). In another example, the device may transmit the target transmission with the same spatial domain transmission filter used for the transmission of the reference RS (e.g., UL RS such as SRS). A device can receive a configuration of a plurality of spatial relation information configurations for a serving cell for transmissions on the serving cell.

FIG. 1 depicts a wireless communication system 100 for determining transmitter EVM for a single layer transmission using a MIMO receiver, according to embodiments of the disclosure. In one embodiment, the wireless communication system 100 includes at least one remote unit 105, a radio access network ("RAN") 120, and a mobile core network 130. The RAN 120 and the mobile core network 130 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 130 are depicted in FIG. 1, one of skill in the art will recognize that any number of remote units 105, base units 110, wireless communication links 115, RANs 120, and mobile core networks 130 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 130.

In some embodiments, the remote units 105 communicate with an application server via a network connection with the mobile core network 130. For example, an application (e.g., web browser, media client, telephone/VoIP application) in a remote unit 105 may trigger the remote unit 105 to establish a PDU session (or other data connection) with the mobile core network 130 via the RAN 120. The mobile core network 130 then relays traffic between the remote unit 105 and the application server in the packet data network 150 using the PDU session. Note that the remote unit 105 may establish one or more PDU sessions (or other data connections) with the mobile core network 130. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 130 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110. Note that during NR-U operation, the base unit 110 and the remote unit 105 communicate over unlicensed radio spectrum.

In one embodiment, the mobile core network 130 is a 5G core ("5GC") or the evolved packet core ("EPC"), which may be coupled to a packet data network 150, like the Internet and private data networks, among other data networks. A remote unit 105 may have a subscription or other account with the mobile core network 130. Each mobile core network 130 belongs to a single public land mobile network ("PLMN"). The present disclosure is not intended to be limited to the implementation of any particular wireless communication system architecture or protocol.

The mobile core network 130 includes several network functions ("NFs"). As depicted, the mobile core network 130 includes multiple user plane functions ("UPFs") 131. The mobile core network 130 also includes multiple control plane functions including, but not limited to, an Access and Mobility Management Function ("AMF") 133 that serves the RAN 120, a Session Management Function ("SMF") 135, and a Unified Data Management function ("UDM") 137. In various embodiments, the mobile core network 130 may also include an Authentication Server Function ("AUSF"), a Policy Control Function ("PCF"), a Network Repository Function ("NRF") (used by the various NFs to discover and communicate with each other over APIs), or other NFs defined for the 5GC.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. In certain embodiments, the various network slices may include separate instances of network functions, such as the SMF 135 and UPF 131. In some embodiments, the different network slices may share some common network functions, such as the AMF 133. The different network slices are not shown in FIG. 1 for case of illustration, but their support is assumed.

Although specific numbers and types of network functions are depicted in FIG. 1, one of skill in the art will recognize that any number and type of network functions may be included in the mobile core network 130. Moreover, where the mobile core network 130 is an EPC, the depicted network functions may be replaced with appropriate EPC entities, such as an MME, S-GW, P-GW, HSS, and the like. In certain embodiments, the mobile core network 130 may include a AAA server.

While FIG. 1 depicts components of a 5G RAN and a 5G core network, the described embodiments for determining transmitter EVM for a single layer transmission using a MIMO receiver apply to other types of communication networks and RATs, including IEEE 802.11 variants, GSM, GPRS, UMTS, LTE variants, CDMA 2000, Bluetooth, Zig-Bee, Sigfoxx, and the like. For example, in an LTE variant involving an EPC, the AMF 133 may be mapped to an MME, the SMF mapped to a control plane portion of a PGW and/or to an MME, the UPF map to an SGW and a user plane portion of the PGW, the UDM/UDR maps to an HSS, etc.

In the following descriptions, the term "gNB" is used for the base station but it is replaceable by any other radio access node, e.g., RAN Node, BS, eNB, gNB, AP, etc. Further the operations are described mainly in the context of 5G NR. However, the proposed solutions/methods are also equally applicable to other mobile communication systems supporting beamforming and/or single layer transmissions and transmission from an antenna port comprised of more than one antenna.

There is a need to define EVM requirements for transmit diversity, single layer transmissions and transmission from an antenna port comprised of more than one antenna. There is currently a way forward that has not yet been agreed for transmit diversity. The EVM definition is required to complete the transmitter requirements and to determine MPR in order to meet these requirements.

The proposed embodiments use a zero-forcing MIMO receiver to define EVM for transmit diversity, single layer transmissions, and transmission from an antenna port comprised of more than one antenna. In this disclosure, the EVM for the layer is computed in terms of $EVM_1$ and $EVM_2$ for the first and second antennas, the correlation p of the transmitter noise and the fraction of the power transmitted on each of the transmit antennas.

The EVM proposal in this disclosure may be better than conventional EVM definitions as it can be mapped to the SNR at the output of a receiver whereas conventional EVM definitions are not based on a technical foundation. It has been proposed that the EVM be defined using an unbiased linear MMSE receiver, but concerns have been expressed that the EVM expression is independent of the distribution of the power between the transmit antennas and that this is not realistic when receiver noise is considered. With the EVM in this proposal, the same receiver architecture can be used to define EVM for both single and dual layer transmissions and this EVM definition also reflects the distribution of power between the transmit antennas.

In one embodiment, the EVM for single layer transmission and transmit diversity is defined using the SNR at the output of a linear zero-forcing MIMO receiver and is expressed in terms of the EVM values for each of the transmit antennas and the correlation of the transmitter noise.

In another embodiment, the maximum power reduction ("MPR") for single layer transmission and transmit diversity is defined using the EVM that is defined in terms of the SNR at the output of the linear zero-forcing MIMO receiver.

An alternative method is proposed for evaluating EVM for the antenna port or single layer transmission in which we use a MIMO receiver even though the second layer is not present. With this approach, the matrix precoder W is given by $$W = \begin{bmatrix} w_1 \\ w_2 \end{bmatrix}$$

where the 1×2 precoding vector $w_1$ is used to transmit the single layer of data and the 1×2 matrix $w_2$ has unit norm and is orthogonal to $w_1$. If the channel H has full rank, the data can be estimated as $$\hat{x} = W^{-1}H^{-1}y = W^{-1}H^{-1}H(Wx + n) = x + v,$$

where $v = W^{-1}nv = W^H n$, and where the second outputs of $\hat{x} = [\hat{x}_1 \ \hat{x}_2]^T$ and $v = [v_1 \ v_2]^T$ can be ignored.

It should be noted that it is not in general possible for the gNB to invert the channel for single-layer transmission unless per antenna reference symbols are transmitted. However, it is still interesting to consider the signal-to-noise ratio that results with the use of this receiver.

With the zero-forcing receiver, the noise measured at the first output of the receiver is given by $$v_1 = w_1^H n.$$

with variance given by $$E|v_1|^2 = w_1^H E(n \ n^H) w_1 = w_1^H \Sigma w_1 = w_1^H W \Sigma' W^H w_1.$$

where $$\Sigma' = E[n' n'^H] = \begin{bmatrix} \sigma_1^2 & \varepsilon \\ \varepsilon^* & \sigma_2^2 \end{bmatrix} \text{ and } n' = \begin{bmatrix} w_0^{-1} n_0 \\ w_1^{-1} n_1 \end{bmatrix}.$$

It can be noted that the variance $E|v_1|^2$ is independent of the channel H so that the EVM is also independent of the channel H.

In the case that the transmitter noise is uncorrelated so that $\Sigma'$ is diagonal, the noise variance is given by $$E|v_1|^2 = |w_{1,0}|^4 \sigma_1^2 + |w_{1,1}|^4 \sigma_2^2$$

and the EVM is given by $$EVM = 100\sqrt{E|v_1|^2} = \sqrt{|w_{1,0}|^4 EVM_1^2 + |w_{11}|^4 EVM_2^2}$$

where $|w_{1,0}|^2 + |w_{1,1}|^2 = 1$. In the special case in which $|w_{1,0}|^2 = |w_{1,1}|^2 = \frac{1}{2}$, it is given $$EVM = \frac{1}{2}\sqrt{EVM_1^2 + EVM_2^2}$$

and in the case that $EVM_1 = EVM_2$, this becomes $$EVM = \frac{1}{\sqrt{2}} EVM_1$$

In the more general case in which transmitter noise is correlated so that $\Sigma'$ is not diagonal, the noise variance is given by $$EVM = \sqrt{|w_{1,0}|^4 EVM_1^2 + |w_{1,1}|^4 EVM_2^2 + 2 \cdot 10^4 |w_{1,0}|^2 |w_{1,1}|^2 Re(\varepsilon)} \le$$

$$\sqrt{|w_{1,0}|^4 EVM_1^2 + |w_{1,1}|^4 EVM_2^2 + 2 \cdot 10^4 |w_{1,0}|^2 |w_{1,1}|^2 |\varepsilon|} =$$

$$\sqrt{|w_{1,0}|^4 EVM_1^2 + |w_{1,1}|^4 EVM_2^2 + 2 \cdot 10^4 |w_{1,0}|^2 |w_{1,1}|^2 \rho \sigma_1 \sigma_2} =$$

$$\sqrt{|w_{1,0}|^4 EVM_1^2 + |w_{1,1}|^4 EVM_2^2 + 2\rho |w_{1,0}|^2 |w_{1,1}|^2 EVM_1 EVM_2}$$

where $\rho = |\varepsilon|/\sigma_1 \sigma_2$. This can be further expressed as $$= \sqrt{|w_{1,0}|^4 EVM_1^2 + (1 - |w_{1,0}|^2)^2 \beta^2 EVM_1^2 + 2\rho\beta |w_{1,0}|^2 (1 - |w_{1,0}|^2) EVM_1^2} =$$

$$EVM_1 \sqrt{|w_{1,0}|^4 + \beta^2 (1 - |w_{1,0}|^2)^2 + 2\rho\beta |w_{1,0}|^2 (1 - |w_{1,0}|^2)} =$$

$$EVM_1 \sqrt{|w_{1,0}|^4 + \beta(1 - |w_{1,0}|^2)(\beta(1 - |w_{1,0}|^2) + 2\rho|w_{1,0}|^2)} =$$

$$EVM_1 \sqrt{|w_{1,0}|^4 + \beta(1 - |w_{1,0}|^2)(\beta(1 - |w_{1,0}|^2) + 2\rho|w_{1,0}|^2)} =$$

$$EVM_1 \sqrt{\gamma^2 + \beta(1 - \gamma)(\beta(1 - \gamma) + 2\rho\gamma)}$$

where $\beta = EVM_2/EVM_1$ and $\gamma = |w_{1,0}|^2$, where $|w_{1,0}|^2 + |w_{1,1}|^2 = 1$ If the correlation $\varepsilon$ cannot be measured by the test equipment, then since $|\varepsilon| \le \sigma_1 \sigma_2$, it follows that $$EVM \le \sqrt{|w_{1,0}|^4 EVM_1^2 + |w_{1,1}|^4 EVM_2^2 + 2|w_{1,0}|^2 |w_{1,1}|^2 EVM_1 EVM_2} =$$

$$|w_{1,0}|^2 EVM_1 + |w_{1,0}|^2 EVM_2 =$$

$$|w_{1,0}|^2 EVM_1 + (1 - |w_{1,0}|^2) EVM_2 = EVM_1 (\beta + |w_{1,0}|^2 (1 - \beta)).$$

where $\beta = EVM_2/EVM_1$.

In one embodiment provided by the Way Forward R4-2008465, EVM is defined as $$EVM_{WF} = \sqrt{(P_1 * EVM_1^2 + P_2 * EVM_2^2)/(P1 + P2)}$$

$$= \sqrt{|w_{1,0}|^2 EVM_1^2 + |w_{1,1}|^2 EVM_2^2}$$

$$= \sqrt{|w_{1,0}|^2 EVM_1^2 + (1 - |w_{1,0}|^2) EVM_2^2}$$

$$= EVM_1 \sqrt{|w_{1,0}|^2 + (1 - |w_{1,0}|^2) \beta^2}$$

$$= EVM_1 \sqrt{\beta^2 + \gamma(1 - \beta^2)}$$

In the special case in which $EVM_1 = EVM_2$, we have $$EVM \le |w_{1,0}|^2 EVM_1 + (1 - |w_{1,0}|^2) EVM_1 = EVM_1$$

and $$EVM_{WF} = \sqrt{|w_{1,0}|^2 EVM_1^2 + (1 - |w_{1,0}|^2) EVM_1^2} = EVM_1$$

thus, the expressions are the same.

Figure 2A:
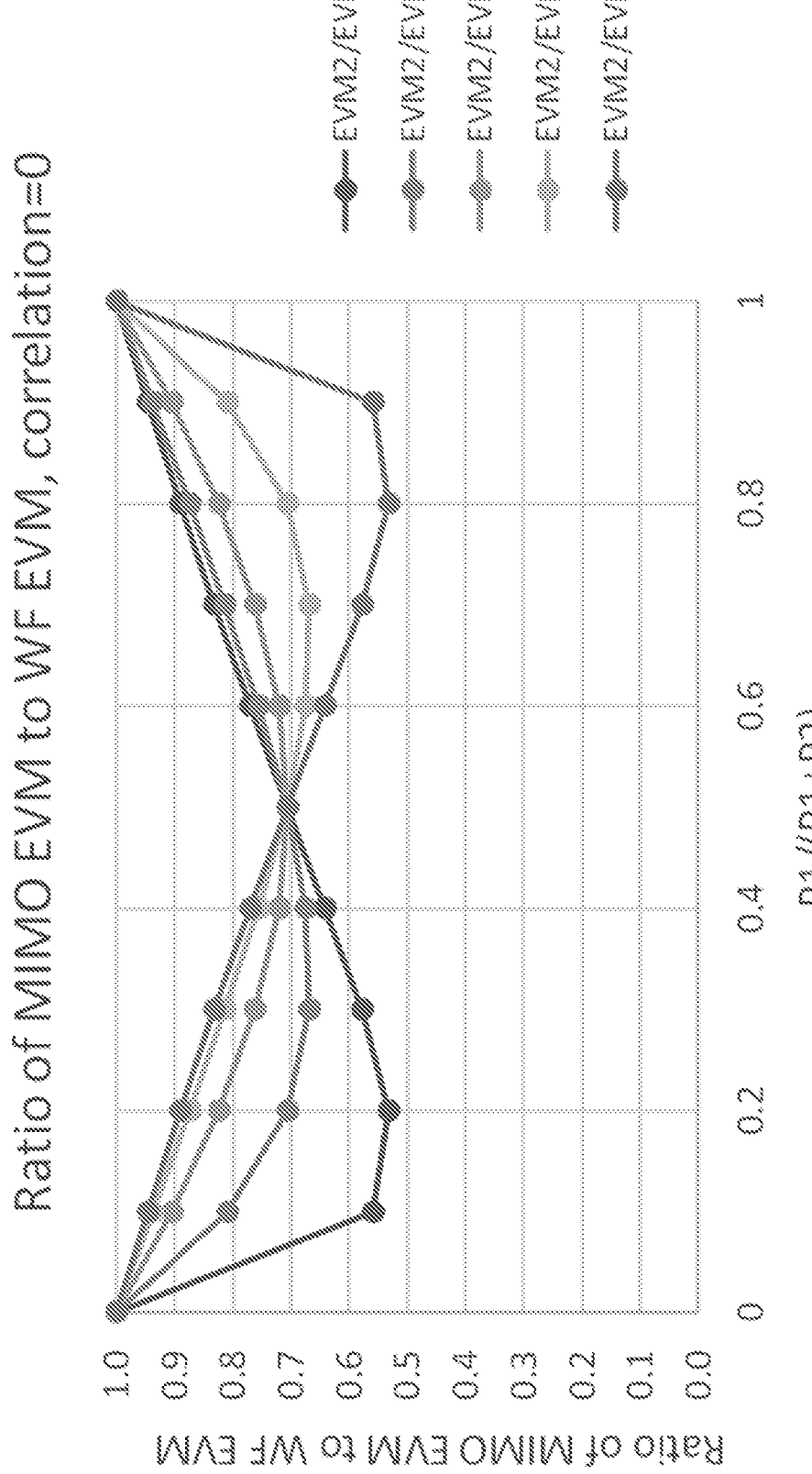
FIG. 2A is a diagram illustrating one embodiment of the ratio of MIMO EVM to $EVM_{MF}$ for transmitter noise correlation $\rho=0$.
Figure 2B:
FIG. 2B is a diagram illustrating one embodiment of the ratio of MIMO EVM to $EVM_{MF}$ for transmitter noise correlation $\rho=0.5$.
Figure 2C:
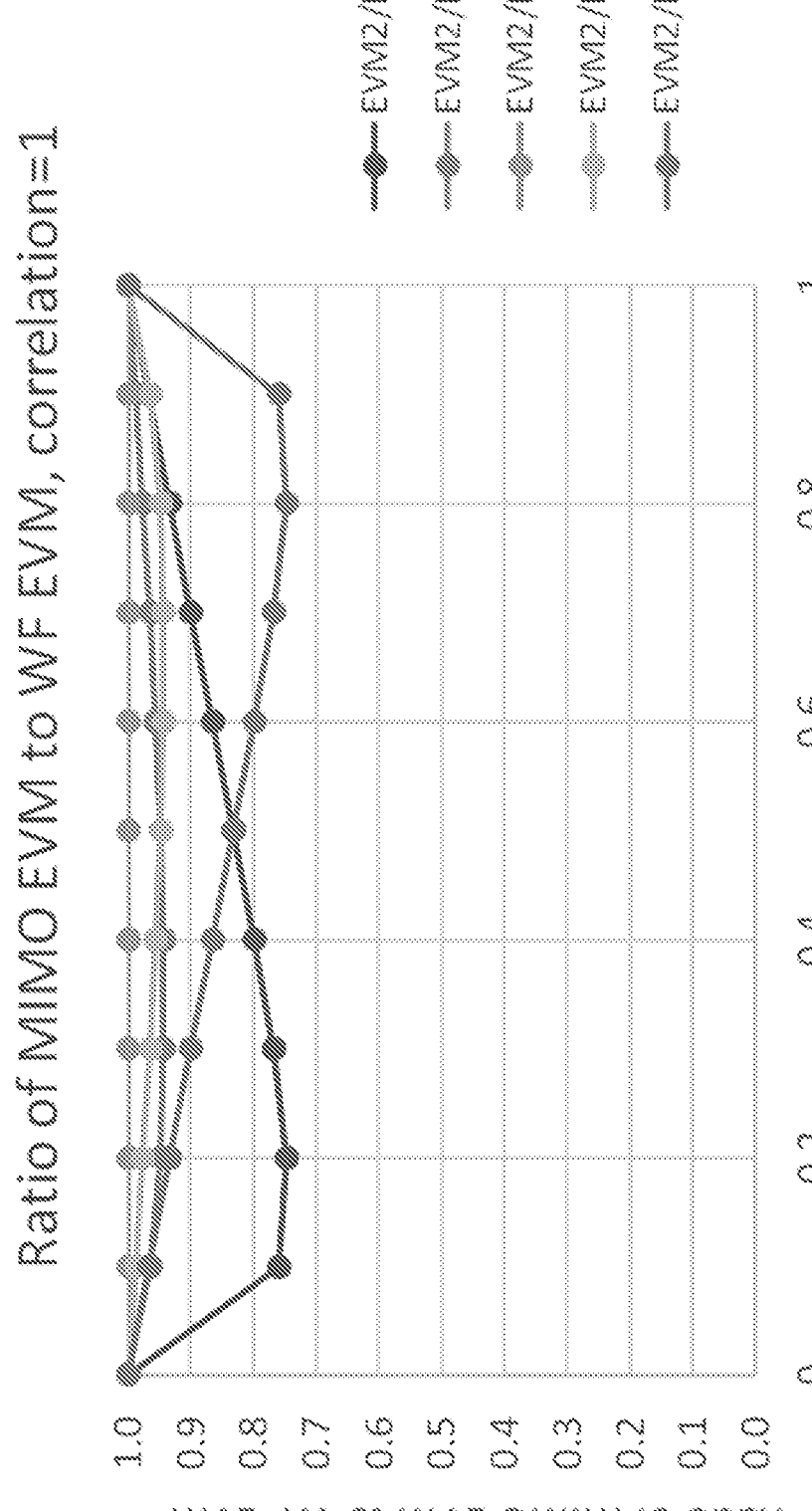
FIG. 2C is a diagram illustrating one embodiment of the ratio of MIMO EVM to $EVM_{MF}$ for transmitter noise correlation $\rho=1$.

In FIGS. 2A-2C, the ratio of the proposed EVM definition using the MIMO receiver relative to the EVM definition is shown in the way forward as a function of the of $\beta = EVM_2/EVM_1$, $\gamma = |w_{1,0}|^2 = P_1/(P_1 + P_2)$, and the correlation coefficient $\rho = |\varepsilon|/\sigma_1 \sigma_2$ of the transmitter. This ratio is given by $$\frac{EVM}{EVM_{WF}} = \frac{EVM_1 \sqrt{\gamma^2 + \beta(1 - \gamma)(\beta(1 - \gamma) + 2\rho\gamma)}}{EVM_1 \sqrt{\beta^2 + \gamma(1 - \beta^2)}}$$

$$= \frac{\sqrt{\gamma^2 + \beta(1 - \gamma)(\beta(1 - \gamma) + 2\rho\gamma)}}{\sqrt{\beta^2 + \gamma(1 - \beta^2)}}.$$

Based on the foregoing, the derivation of EVM can be expressed as:

$$EVM \le |w_{1,0}|^2 EVM_1 + |w_{1,1}|^2 EVM_2 = \frac{P_1}{P_1 + P_2} EVM_1 + (1 - |w_{1,0}|^2) EVM_2 =$$

$$\frac{P_1}{P_1 + P_2} EVM_1 + \frac{P_2}{P_1 + P_2} EVM_2 = \frac{P_1 EVM_1 + P_2 EVM_2}{P_1 + P_2}.$$

for different values of the transmitter correlation. Accordingly, from FIGS. 2A-2C, it can be seen that it is true that $EVM \le EVM_{WF}$, and this relationship can be proved for all values of $\beta$, $\gamma$, $\rho$ using Jensen's inequality.

In some embodiments, using the MIMO receiver provides:

The MIMO EVM definition can be tied to a reference receiver and is thus not ad hoc;

The MIMO EVM definition is independent of the channel between the transmitter and the receiver as it must be since the definition must be independent of the channel;

This MIMO EVM is less than the $EVM_{MF}$ in the current way forward, and thus less MPR is needed to meet emissions requirements;

The same receiver can be used to evaluate EVM for single layer transmission as is used for MIMO transmission;

The MIMO EVM definition is generally more acceptable than the unbiased linear MMSE definition because it depends on the power distribution between the two antennas and does not encourage the UE manufacture to abuse the EVM definition as is possible by allocating a small amount of power to the antenna with the better EVM in order to pass the EVM requirement;

The method is more acceptable to test equipment vendors since it can be written in terms of the per antenna EVM values; and By expressing the EVM in terms of the per antenna EVM values, the EVM can be calculated without the need to estimate the 2×2 channel, since this would require the transmission of per antenna reference symbols.

Figure 3:
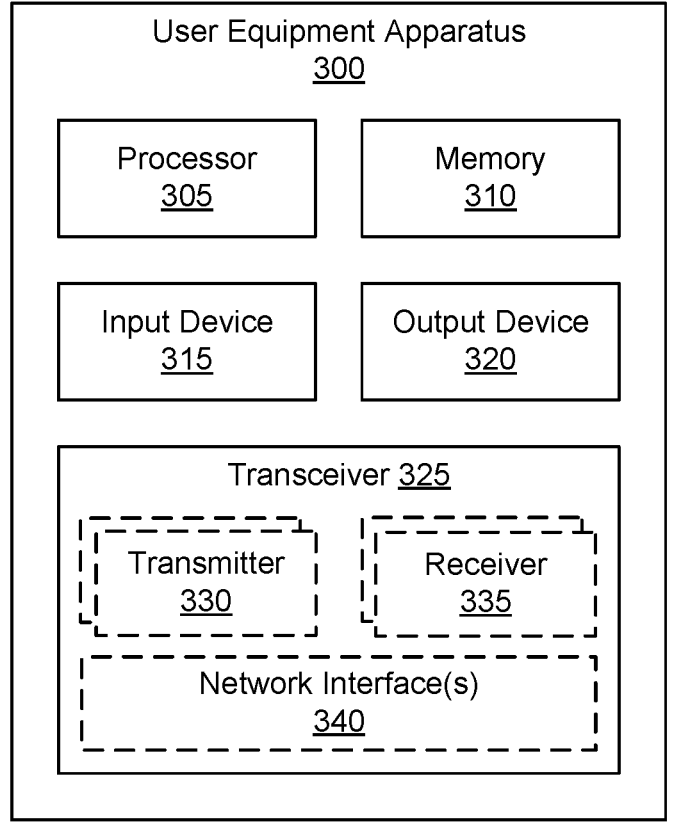
FIG. 3 is a diagram illustrating one embodiment of a user equipment apparatus that may be used for determining transmitter EVM for a single layer transmission using a MIMO receiver.

FIG. 3 depicts a user equipment apparatus 300 that may be used determining transmitter EVM for a single layer transmission using a MIMO receiver, according to embodiments of the disclosure. In various embodiments, the user equipment apparatus 300 is used to implement one or more of the solutions described above. The user equipment apparatus 300 may be one embodiment of the remote unit 105 and/or the UE 205, described above. Furthermore, the user equipment apparatus 300 may include a processor 305, a memory 310, an input device 15, an output device 320, and a transceiver 325.

In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of: the processor 305, the memory 310, and the transceiver 325, and may not include the input device 315 and/or the output device 320.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325.

In various embodiments, the processor 305 controls the user equipment apparatus 300 to implement the above described UE behaviors. In one embodiment, the transceiver 325 receives, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the processor 305 determines an EVM for the single layer transmission from the transmitter based on an output of the unbiased linear MIMO receiver, the EVM defined as 100 times a square root of a mean-square error at the output of the unbiased linear MIMO receiver.

In one embodiment, the unbiased linear MIMO receiver is a zero-forcing MIMO receiver. In one embodiment, the processor 305 expresses the mean square-error in terms of a correlation matrix of transmitter noise at an output of the plurality of antennas comprising the antenna port of the transmitter.

In one embodiment, the processor 305 expresses the EVM as a function of power transmitted on each of the plurality of antennas comprising the antenna port of the transmitter and measuring the EVM at each of the plurality of antennas. In one embodiment, the antenna port comprises at least two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to determining transmitter EVM for a single layer transmission using a MIMO receiver. For example, the memory 310 may store reference signals, channel characteristics, and the like as described above. In certain embodiments, the memory 310 also stores program code and related data, such as an operating system or other controller algorithms operating on the apparatus 300.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all or portions of the output device 320 may be integrated with the input device 315. For example, the input device 315 and output device 320 may form a touchscreen or similar touch-sensitive display. In other embodiments, the output device 320 may be located near the input device 315.

The transceiver 325 communicates with one or more network functions of a mobile communication network via one or more access networks. The transceiver 325 operates under the control of the processor 305 to transmit messages, data, and other signals and also to receive messages, data, and other signals. For example, the processor 305 may selectively activate the transceiver 325 (or portions thereof) at particular times in order to send and receive messages.

The transceiver 325 includes at least transmitter 330 and at least one receiver 335. One or more transmitters 330 may be used to provide UL communication signals to a base unit 110, such as the UL transmissions described herein. Similarly, one or more receivers 335 may be used to receive DL communication signals from the base unit 110, as described herein. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

In various embodiments, one or more transmitters 330 and/or one or more receivers 335 may be implemented and/or integrated into a single hardware component, such as a multi-transceiver chip, a system-on-a-chip, an ASIC, or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module.

Figure 4:
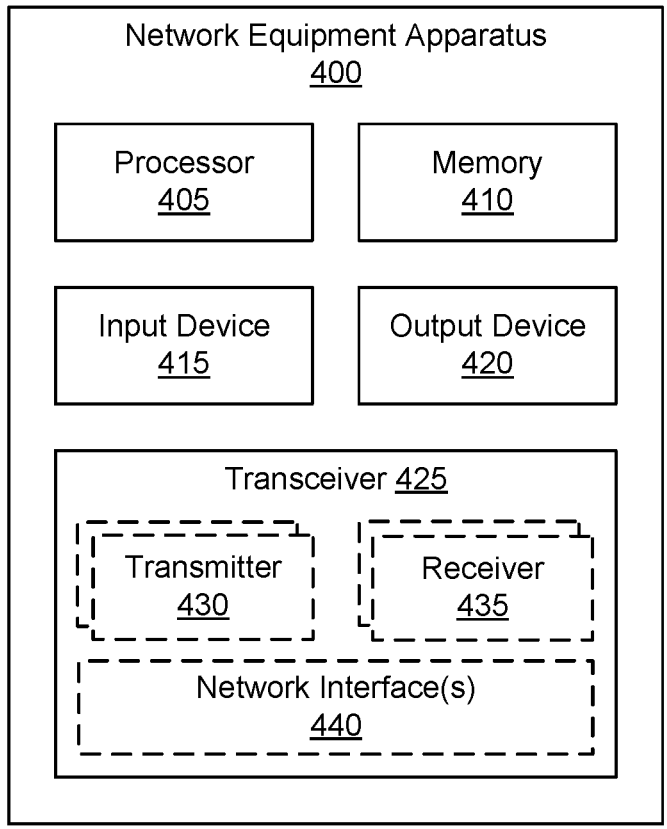
FIG. 4 is a diagram illustrating one embodiment of a network equipment apparatus that may be used for determining transmitter EVM for a single layer transmission using a MIMO receiver.

FIG. 4 depicts a network equipment apparatus 400 that may be used for determining transmitter EVM for a single layer transmission using a MIMO receiver, according to embodiments of the disclosure. The network equipment apparatus 400 may be one embodiment of the base unit 110 or gNB, described above. Furthermore, the network equipment apparatus 400 may include a processor 405, a memory 410, an input device 415, an output device 420, and a transceiver 425. In some embodiments, the input device 415 and the output device 420 are combined into a single device, such as a touchscreen. In certain embodiments, the network equipment apparatus 400 may not include any input device 415 and/or output device 420. In various embodiments, the network equipment apparatus 400 may include one or more of: the processor 405, the memory 410, and the transceiver 425, and may not include the input device 415 and/or the output device 420.

The processor 405, in one embodiment, may include any known controller capable of executing computer-readable instructions and/or capable of performing logical operations. For example, the processor 405 may be a microcontroller, a microprocessor, a CPU, a GPU, an auxiliary processing unit, a FPGA, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In various embodiments, the processor 405 controls the network equipment apparatus 400 to implement the above described gNB behaviors.

The memory 410, in one embodiment, is a computer readable storage medium. In some embodiments, the memory 410 includes volatile computer storage media. For example, the memory 410 may include a RAM, including dynamic RAM ("DRAM"), synchronous dynamic RAM ("SDRAM"), and/or static RAM ("SRAM"). In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data related to determining transmitter EVM for a single layer transmission using a MIMO receiver. For example, the memory 410 may store reference signals, channel characteristics, and the like. In certain embodiments, the memory 410 also stores program code and related data, such as an operating system or other controller algorithms operating on the remote unit 45.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, is designed to output visual, audible, and/or haptic signals. In some embodiments, the output device 420 includes an electronically controllable display or display device capable of outputting visual data to a user. For example, the output device 420 may include, but is not limited to, an LCD display, an LED display, an OLED display, a projector, or similar display device capable of outputting images, text, or the like to a user. As another, non-limiting, example, the output device 420 may include a wearable display separate from, but communicatively coupled to, the rest of the network equipment apparatus 400, such as a smart watch, smart glasses, a heads-up display, or the like. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all or portions of the output device 420 may be integrated with the input device 415. For example, the input device 415 and output device 420 may form a touchscreen or similar touch-sensitive display. In other embodiments, the output device 420 may be located near the input device 415.

The transceiver 425 includes at least transmitter 430 and at least one receiver 435. One or more sets of transmitters 430 and receivers 435 may be used to communicate with the UE, as described herein. Similarly, one or more sets of transmitters 430 and receivers 435 may be used to communicate with network functions in the PLMN and/or RAN, as described herein. Although only one transmitter 430 and one receiver 435 are illustrated, the network equipment apparatus 400 may have any suitable number of transmitters 430 and receivers 435. Further, the transmitter(s) 425 and the receiver(s) 430 may be any suitable type of transmitters and receivers.

In one embodiment, the transceiver 425 receives, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the processor 405 determines an EVM for the single layer transmission from the transmitter based on an output of the unbiased linear MIMO receiver, the EVM defined as 100 times a square root of a mean-square error at the output of the unbiased linear MIMO receiver.

In one embodiment, the unbiased linear MIMO receiver is a zero-forcing MIMO receiver. In one embodiment, the processor 405 expresses the mean square-error in terms of a correlation matrix of transmitter noise at an output of the plurality of antennas comprising the antenna port of the transmitter.

In one embodiment, the processor 405 expresses the EVM as a function of power transmitted on each of the plurality of antennas comprising the antenna port of the transmitter and measuring the EVM at each of the plurality of antennas. In one embodiment, the antenna port comprises at least two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

FIG. 5 is a flowchart diagram of a method 500 for determining transmitter EVM for a single layer transmission using a MIMO receiver. The method 500 may be performed by a UE, such as the remote unit 105 and/or the user equipment apparatus 300, and/or a network device such as a gNB and/or the network equipment apparatus 400. In some embodiments, the method 500 may be performed by a processor executing program code, for example, a microcontroller, a microprocessor, a CPU, a GPU, an auxiliary processing unit, a FPGA, or the like.

In one embodiment, the method 500 includes receiving 505, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the method 500 includes determining 510 an EVM for the single layer transmission from the transmitter based on an output of the unbiased linear MIMO receiver, the EVM defined as 100 times a square root of a mean-square error at the output of the unbiased linear MIMO receiver. The method 500 ends.

FIG. 6 is a flowchart diagram of a method 600 for determining transmitter EVM for a single layer transmission using a MIMO receiver. The method 600 may be performed by a UE, such as the remote unit 105 and/or the user equipment apparatus 300, and/or a network device such as a gNB and/or the network equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 includes receiving 605 a single layer transmission signal transmitted via a propagation channel, the signal generated and transmitted using an antenna port at a transmitter, the antenna port comprising a plurality of antennas and an antenna connector for each of the plurality of antennas. In one embodiment, the method 600 includes defining 610 EVM for transmit diversity of a single layer transmission using at least two antennas of the plurality of antennas, the EVM given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas. The method 600 ends.

A first apparatus is disclosed for determining transmitter EVM for a single layer transmission using a MIMO receiver. The first apparatus may include a UE, such as the remote unit 105 and/or the user equipment apparatus 300, and/or a network device such as a gNB and/or the network equipment apparatus 400. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver that receives, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the first apparatus includes a processor that determines an EVM for the single layer transmission from the transmitter based on an output of the unbiased linear MIMO receiver, the EVM defined as 100 times a square root of a mean-square error at the output of the unbiased linear MIMO receiver.

In one embodiment, the unbiased linear MIMO receiver is a zero-forcing MIMO receiver. In one embodiment, the processor expresses the mean square-error in terms of a correlation matrix of transmitter noise at an output of the plurality of antennas comprising the antenna port of the transmitter.

In one embodiment, the processor expresses the EVM as a function of power transmitted on each of the plurality of antennas comprising the antenna port of the transmitter and measuring the EVM at each of the plurality of antennas. In one embodiment, the antenna port comprises at least two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

A first method is disclosed for determining transmitter EVM for a single layer transmission using a MIMO receiver. The first method may be performed by a UE, such as the remote unit 105 and/or the user equipment apparatus 300, and/or a network device such as a gNB and/or the network equipment apparatus 400. In some embodiments, the first method may be performed by a processor executing program code, for example, a microcontroller, a microprocessor, a CPU, a GPU, an auxiliary processing unit, a FPGA, or the like.

In one embodiment, the first method includes receiving, using an unbiased linear multiple-input multiple-output ("MIMO") receiver, a single layer transmission signal transmitted via a propagation channel, the signal generated and transmitted using an antenna port at a transmitter, the antenna port comprising a plurality of antennas and an antenna connector for each of the plurality of antennas. In one embodiment, the first method includes determining an EVM for the single layer transmission from the transmitter based on an output of the unbiased linear MIMO receiver, the EVM defined as 100 times a square root of a mean-square error at the output of the unbiased linear MIMO receiver.

In one embodiment, the unbiased linear MIMO receiver is a zero-forcing MIMO receiver. In one embodiment, the first method includes expressing the mean square-error in terms of a correlation matrix of transmitter noise at an output of the plurality of antennas comprising the antenna port of the transmitter.

In one embodiment, the first method includes expressing the EVM as a function of power transmitted on each of the plurality of antennas comprising the antenna port of the transmitter and measuring the EVM at each of the plurality of antennas. In one embodiment, the antenna port comprises at least two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

A second apparatus is disclosed for determining transmitter EVM for a single layer transmission using a MIMO receiver. The second apparatus may include a UE, such as the remote unit 105 and/or the user equipment apparatus 300, and/or a network device such as a gNB and/or the network equipment apparatus 400. In some embodiments, the second apparatus may include a processor executing program code, for example, a microcontroller, a microprocessor, a CPU, a GPU, an auxiliary processing unit, a FPGA, or the like.

In one embodiment, the second apparatus includes a transceiver that receives a single layer transmission signal transmitted via a propagation channel, the signal generated and transmitted using an antenna port at a transmitter, the antenna port comprising a plurality of antennas and an antenna connector for each of the plurality of antennas. In one embodiment, the second apparatus includes a processor that defines EVM for transmit diversity of a single layer transmission using at least two antennas of the plurality of antennas, the EVM given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

In one embodiment, the EVM values $EVM_1$ and $EVM_2$ for the first and second transmit antennas are a function of the transmit power values $P_1$ and $P_2$ for the first and second antenna connectors. In one embodiment, the transceiver receives the single layer transmission signal using an unbiased linear multiple-input multiple-output ("MIMO") receiver, the MIMO receiver comprising a zero-forcing MIMO receiver.

In one embodiment, the processor determines the EVM for the single layer transmission from the transmitter based on an output of the unbiased linear MIMO receiver, the EVM defined as 100 times a square root of a mean-square error at the output of the unbiased linear MIMO receiver.

In one embodiment, the processor includes expressing the mean square-error in terms of a correlation matrix of transmitter noise at an output of the plurality of antennas comprising the antenna port of the transmitter.

A second method is disclosed for determining transmitter EVM for a single layer transmission using a MIMO receiver. The second method may be performed by a UE, such as the remote unit 105 and/or the user equipment apparatus 300, and/or a network device such as a gNB and/or the network equipment apparatus 400. In some embodiments, the second method may be performed by a processor executing program code, for example, a microcontroller, a microprocessor, a CPU, a GPU, an auxiliary processing unit, a FPGA, or the like.

In one embodiment, the second method includes receiving a single layer transmission signal transmitted via a propagation channel, the signal generated and transmitted using an antenna port at a transmitter, the antenna port comprising a plurality of antennas and an antenna connector for each of the plurality of antennas. In one embodiment, the second method includes defining EVM for transmit diversity of a single layer transmission using at least two antennas of the plurality of antennas, the EVM given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port of the transmitter and $P_1$ and $P_2$ are values of power transmitted on the first and second transmit antennas.

In one embodiment, the EVM values $EVM_1$ and $EVM_2$ for the first and second transmit antennas are a function of the transmit power values $P_1$ and $P_2$ for the first and second antenna connectors. In one embodiment, the second method includes receiving the single layer transmission signal using an unbiased linear multiple-input multiple-output ("MIMO") receiver, the MIMO receiver comprising a zero-forcing MIMO receiver.

In one embodiment, the second method includes determining the EVM for the single layer transmission from the transmitter based on an output of the unbiased linear MIMO receiver, the EVM defined as 100 times a square root of a mean-square error at the output of the unbiased linear MIMO receiver.

In one embodiment, the second method includes expressing the mean square-error in terms of a correlation matrix of transmitter noise at an output of the plurality of antennas comprising the antenna port of the transmitter.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment ("UE"), the method comprising:

receiving a single layer transmission signal via a propagation channel, wherein the single layer transmission signal is generated and transmitted using an antenna port comprising a plurality of antennas and an antenna connector for each of the plurality of antennas; and defining an error vector magnitude ("EVM") for transmit diversity of the single layer transmission signal using at least two of the plurality of antennas, wherein the EVM is expressed as a power-weighted combination or per-antenna EVM value.

2. The method of claim 1, wherein the EVM is defined as 100 times a square root of a mean square error as an output of a receiver that is a zero-forcing unbiased linear multiple-input multiple-output ("MIMO") receiver.

3. The method of claim 1, further comprising expressing a mean square error in terms of a correlation matrix of transmitter noise at an output of the plurality of antennas.

4. The method of claim 1, further comprising expressing the EVM as a function of power transmitted on each of the plurality of antennas comprising the antenna port and measuring the EVM at each of the plurality of antennas.

5. The method of claim 1, wherein the antenna port comprises two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port and $P_1$ and $P_2$ are values of transmit power on the first and second transmit antennas.

6. A user equipment ("UE") for wireless communication, comprising:

at least one memory; and at least one processor coupled with the at least one memory and configured to cause the UE to:

receive a single layer transmission signal via a propagation channel, wherein the single layer transmission signal is generated and transmitted using an antenna port comprising a plurality of antennas and an antenna connector for each of the plurality of antennas; and define an error vector magnitude ("EVM") for transmit diversity of the single layer transmission signal using at least two of the plurality of antennas, wherein the EVM is expressed as a power-weighted combination or per-antenna EVM value.

7. The UE of claim 6, wherein the EVM is defined as 100 times a square root of a mean square error as an output of a receiver that is a zero-forcing unbiased linear multiple-input multiple-output ("MIMO") receiver.

8. The UE of claim 6, wherein the at least one processor is configured to cause the UE to express a mean square error in terms of a correlation matrix of transmitter noise at an output of the plurality of antennas.

9. The UE of claim 6, wherein the at least one processor is configured to cause the UE to express the EVM as a function of power transmitted on each of the plurality of antennas comprising the antenna port and measuring the EVM at each of the plurality of antennas.

10. The UE of claim 6, wherein the antenna port comprises two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port and $P_1$ and $P_2$ are values of transmit power on the first and second transmit antennas.

11. A user equipment ("UE") for wireless communication, comprising:

at least one memory; and at least one processor coupled with the at least one memory and configured to cause the UE to:

receive a single layer transmission signal via a propagation channel, the single layer transmission signal associated with an antenna port comprising a plurality of antennas and an antenna connector for each of the plurality of antennas; and define error vector magnitude ("EVM") for transmit diversity of the single layer transmission signal using two antennas of the plurality of antennas, the EVM given by:

$$EVM = \frac{P_1 EVM_1 + P_2 EVM_2}{P_1 + P_2}$$

where $EVM_1$ and $EVM_2$ are EVM values for first and second transmit antennas of the plurality of antennas comprising the antenna port and $P_1$ and $P_2$ are values of transmit power on the first and second transmit antennas.

12. The UE of claim 11, wherein the EVM values $EVM_1$ and $EVM_2$ for the first and second transmit antennas are a function of the values of transmit power $P_1$ and $P_2$ for the first and second transmit antennas.

13. The UE of claim 11, wherein the at least one processor is configured to cause the UE to receive the single layer transmission signal using a zero-forcing unbiased linear multiple-input multiple-output ("MIMO") receiver.

14. The UE of claim 13, wherein the at least one processor is configured to cause the UE to determine the EVM for the single layer transmission signal, the EVM defined as 100 times a square root of a mean square error at an output of a receiver of the UE.

15. The UE of claim 14, wherein the at least one processor is configured to cause the UE to express the mean square error in terms of a correlation matrix of transmitter noise at an output of the plurality of antennas.

16. A processor for wireless communication, comprising:
   at least one controller coupled with at least one memory and configured to cause the processor to:
      receive a single layer transmission signal via a propagation channel, wherein the single layer transmission signal is generated and transmitted using an antenna port comprising a plurality of antennas and an antenna connector for each of the plurality of antennas; and
      define an error vector magnitude ("EVM") for transmit diversity of the single layer transmission signal using at least two of the plurality of antennas, wherein the EVM is expressed as a power-weighted combination or per-antenna EVM value.

17. The processor of claim 16, wherein the EVM is defined as 100 times a square root of a mean square error as an output of a receiver that is a zero-forcing unbiased linear multiple-input multiple-output ("MIMO") receiver.

18. The processor of claim 16, wherein the at least one controller is configured to cause the processor to express a mean square error in terms of a correlation matrix of transmitter noise at an output of the plurality of antennas.

19. The processor of claim 16, wherein the at least one controller is configured to cause the processor to express the EVM as a function of power transmitted on each of the plurality of antennas comprising the antenna port and measuring the EVM at each of the plurality of antennas.

20. The processor of claim 16, wherein the antenna port comprises two transmit antennas, the EVM for the single layer transmission given by:

$$EVM = \frac{P_1 EVM_1 + P_2 EVM_2}{P_1 + P_2}$$

where $EVM_1$ and $EVM_2$ are the EVM values for first and second transmit antennas of the plurality of antennas comprising the antenna port and $P_1$ and $P_2$ are values of transmit power on the first and second transmit antennas.

* * * * *